June 8, 1954
L. L. KANDRA ET AL
2,680,509
ARTICLE DISTRIBUTION APPARATUS FOR CONVEYERS
Filed June 5, 1953
2 Sheets-Sheet 1
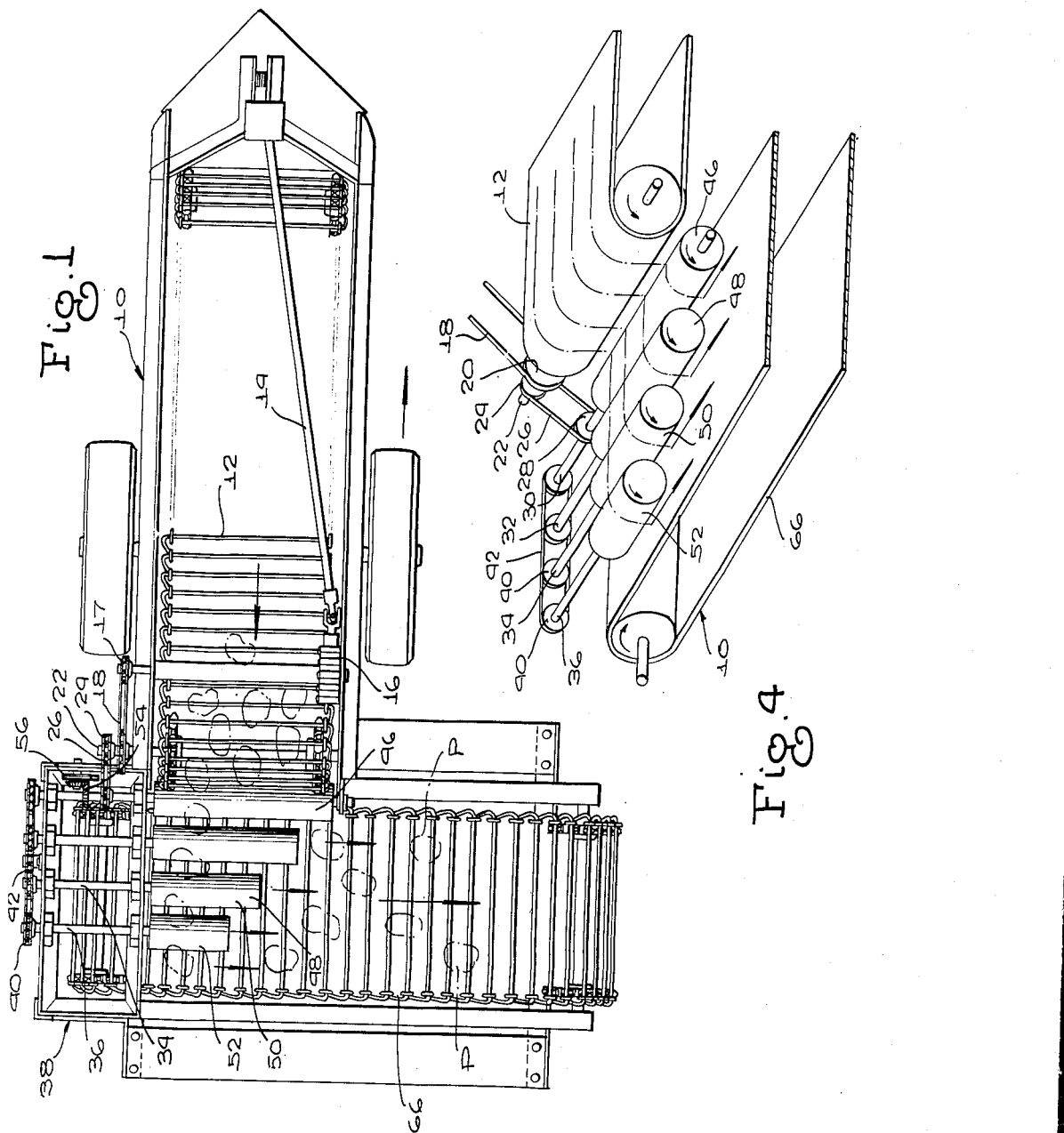
INVENTORS
LAWSON L. KANDRA
& JAMES R. POPE
BY
McMorrow, Berman & Davidson
ATTORNEYS June 8, 1954
L. L. KANDRA ET AL
2,680,509
ARTICLE DISTRIBUTION APPARATUS FOR CONVEYERS
Filed June 5, 1953
2 Sheets-Sheet 2
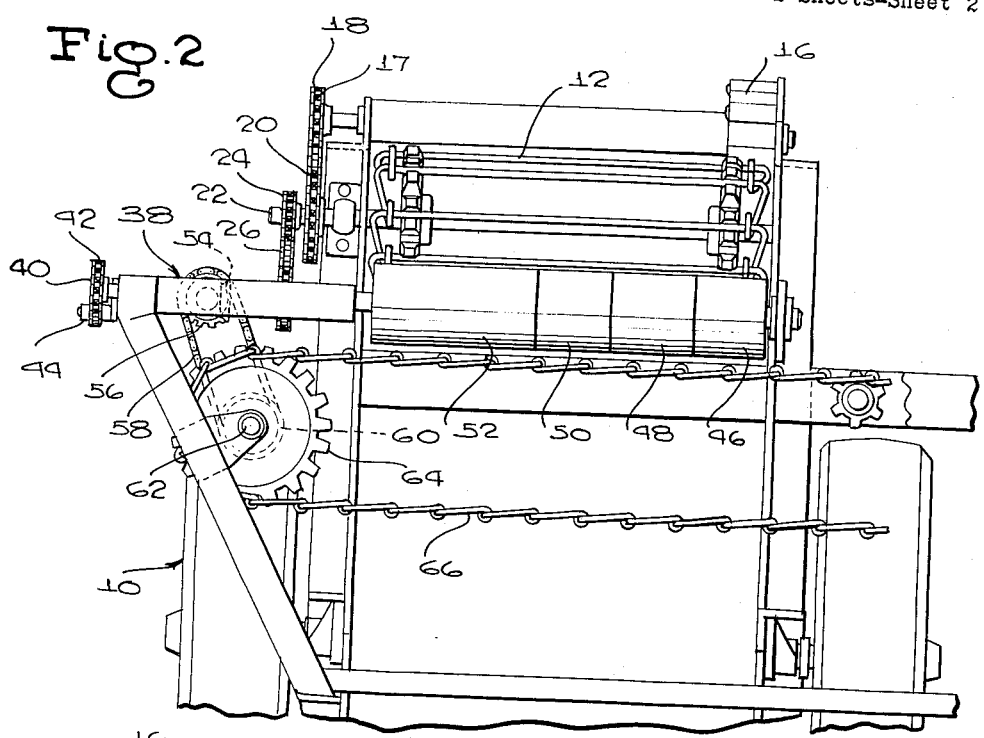
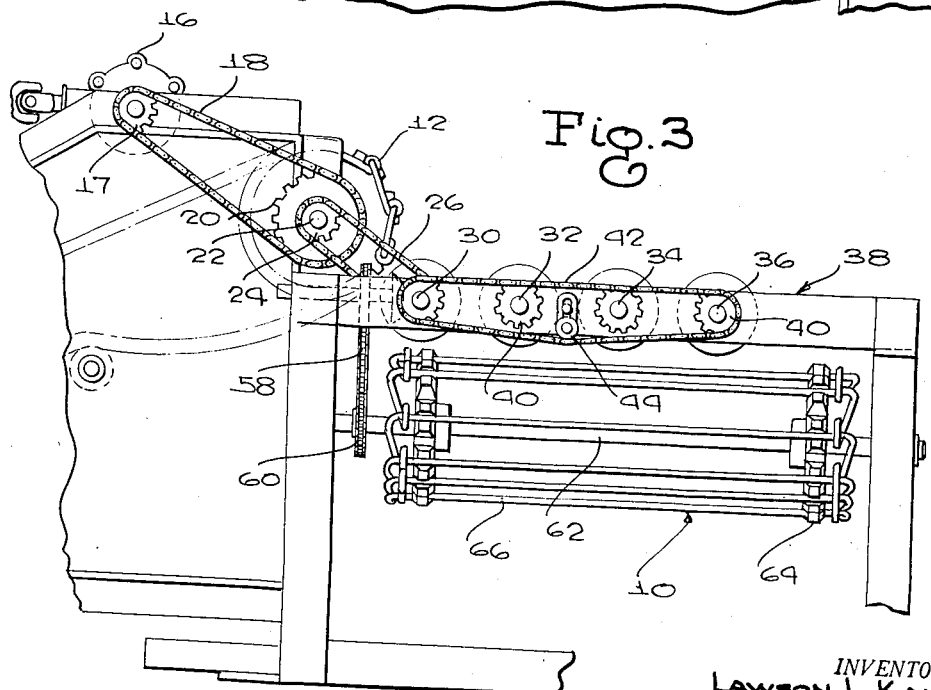
INVENTORS
LAWSON L. KANDRA
& JAMES R. POPE
BY
McMorrow, Berman & Davidson
ATTORNEYS Patented June 8, 1954

2,680,509

UNITED STATES PATENT OFFICE 2,680,509

ARTICLE DISTRIBUTION APPARATUS FOR CONVEYERS

Lawson L. Kandra and James R. Pope, Merrill, Oreg.

Application June 5, 1953, Serial No. 359,823

5 Claims. (Cl. 198—30)

This invention relates to conveyor construction, and more particularly has reference to means adapted to be associated with conventional conveyors of the endless belt type, and arranged to distribute articles uniformly over the width of one conveyor to which said articles move after passage from a preceding conveyor.

In many industries, the passage of articles from a first conveyor to a second conveyor angularly related to said first conveyor is accompanied by an undesirable massing of the articles on the second conveyor. This characteristic of angularly related conveyors can be readily appreciated, when it is borne in mind that the articles may be distributed uniformly over the width of the first conveyor. This being so, the articles, when moving off the first conveyor, will tend to align themselves longitudinally of the second conveyor, rather than distribute themselves uniformly over the width of said second conveyor.

Massing of articles on a conveyor in elongated heaps is undesirable, of course, where, for example, foreign material must be separated from said articles during the movement thereof upon the conveyor. For example, it is customary, in potato harvesting operations, to pick or dig the potatoes with a first conveyor extending in the direction of travel, with the potatoes then being transferred to a second conveyor moving at right angles to the first conveyor, for deposit in an accompanying truck or the like. During the movement of the potatoes upon the second conveyor, it is usual to employ workers for the purpose of removing unwanted material, and it has been found essential that one worker be occupied entirely with distributing the potatoes uniformly over the width of the second conveyor, thereby to permit other workers to remove said material.

The main object of the present invention is to provide, in association with first and second conveyors of the type illustrated, a transfer apparatus in the form of a multiplicity of transfer rollers, said rollers being formed to different lengths with the rollers decreasing in length in a direction away from the first conveyor, the ends of the rollers terminating substantially on a line bisecting the angle defined by the conveyors. By reason of this arrangement, it is proposed that the articles falling from the first conveyor will pass to the multiplicity of rollers, with the progressively decreased lengths of the rollers being adapted to effect distribution of the articles over the full width of the second conveyor. In view of this construction, the services of the worker heretofore used for distributing the articles over the width of the second conveyor may be dispensed with, with an attendant saving.

Another object of importance is to provide transfer apparatus of the character referred to which will effect the transfer of the articles from the first to the second conveyors with a minimum loss in elevation. This is of importance where the articles are subject to becoming bruised or damaged if required to move through free fall over a substantial distance.

Another object of importance is to provide a transfer apparatus as described which will be so designed as to permit said apparatus to be mountable upon a conveyor assembly as an attachment, without requiring modification of redesign of said assembly, except perhaps to a very minor extent.

Another object of importance is to provide transfer means as stated which can be linked to the first and second conveyors in such a manner as to permit the several rollers of the transfer apparatus to be driven simultaneously with said conveyors, from a common source of motive power.

Other objects will appear from the following description, the claims appended thereto, and from the annexed drawings, in which like reference characters designate like parts throughout the several views, and wherein:

Figure 1 is a top plan view of a conveyor assembly used in potato harvesting operations, equipped with distribution apparatus formed in accordance with the present invention;

Figure 2 is an enlarged, fragmentary elevational view taken from the left in Figure 1;

Figure 3 is a fragmentary elevational view taken from the left in Figure 2; and

Figure 4 is a diagrammatic perspective view of the distribution apparatus and the conveyors associated therewith.

The reference numeral 10 is applied generally in the drawing to designate a wheeled potato harvester assembly. At this point, it should be noted that although a potato harvester has been illustrated in the drawing by way of example, the invention can be used advantageously with other types of conveyor devices, whether said devices are being used for conveying fruit, vegetables, or other relatively small articles. It is believed mainly important to note that the distribution apparatus is designed to facilitate particularly the proper distribution, over the width of a conveyor, of relatively small articles which normally would tend to mass upon the conveyor in elongated, longitudinally extending heaps.

In any event, in the illustrated example of the invention, the harvesting apparatus has a first or pick-up conveyor 12, said conveyor 12 extending in line with the direction of travel of the apparatus.

For the purpose of driving the pick-up conveyor 12, a shaft 14 is provided, said shaft extending from a suitable source of motor power, not shown, and being connected by a universal joint to a stub shaft geared to the shaft of a conveyor drive sprocket 16. Sprocket 16 is of conventional design, having radial projections engaging between the cleats or rods of the pick-up conveyor.

The sprocket 16 has its shaft extending transversely of the pick-up conveyor, beyond the other side of the pick-up conveyor, a sprocket 17 being secured to said shaft. A chain 18 is trained about sprocket 17, and drives a sprocket 20 secured to a shaft 22 journaled on the conveyor frame and having idler rollers over which the pick-up conveyor is trained.

The shaft 22 has a sprocket 24 keyed or otherwise secured thereto, said sprocket 24 being rotated by the shaft 22 and having a chain 26 trained thereabout. Chain 26 drives a sprocket 28, the sprocket 28 rotating a main distribution roller shaft 30. Roller shaft 30 is disposed in parallel relation to roller shafts 32, 34, 36, the several roller shafts being journaled in bearings mounted upon opposite sides of an open, rectangular framework 38.

The framework 38 is fixedly mounted upon the conveyor frame, beyond one end of the pick-up conveyor 12.

For the purpose of transmitting rotation to the shafts 32, 34, 36, sprockets 40 are secured to said shafts, and to the main roller shaft 30 (Figure 3), a roller drive chain 42 being engaged by said sprockets 40. A tension adjusting roller 44 is slidably mounted upon the framework 38, so as to hold the chain 42 under a selected amount of tension.

Secured to the several roller shafts 30, 32, 34, 36 are distribution rollers 46, 48, 50, 52 respectively. As will be noted from Figure 1, said rollers are of different lengths, the rollers extending in parallel relation and being progressively decreased in length in a direction away from the pick-up conveyor 12. The rollers are extended transversely of the pick-up conveyor, and are so disposed as to receive potatoes P or other articles, as said articles fall from the discharge end of the pick-up conveyor.

For the purpose of driving a second conveyor to which the articles are to be transferred, a bevel gear 54 is secured to the main roller shaft 30. Gear 54 is in mesh with a bevel gear 56, the gear 56 being mounted upon a stub shaft for the purpose of rotating said stub shaft. Secured to the stub shaft to be rotated thereby is a sprocket about which is trained a chain 58 (Figure 3), said chain driving a sprocket 60 mounted upon a conveyor drive shaft 62. Drive shaft 62 rotates conveyor drive sprockets 64, a receiving conveyor 66 being in mesh with said sprockets 64 so as to be powered thereby.

The receiving or second conveyor 66, as shown in Figure 1, is disposed at right angles to the first conveyor 12. The particular angle defined by the respective conveyors can, of course, be varied, the right angular relationship shown in Figure 1 being illustrated purely by way of example.

It is important to note that the several rollers 46, 48, 50, 52 overlie the second conveyor, beyond one end of the first conveyor, and have their free ends terminating in a line substantially bisecting the angle defined by the conveyors. In other words, the particular length of the several rollers, and the arrangement of the free ends thereof, is such as to cause the articles gravitating from the discharge end of the first conveyor to fall first to the longest roller 46. The articles then tend to move to the next longest roller 48, but roller 48, being shorter in length than roller 46, will receive only some of the articles, the remaining articles passing directly from the roller 46 to the conveyor 66, and being disposed along the inner side of said conveyor 66.

This arrangement continues, with the articles being passed over successively following rollers, some of the articles being dropped on to the second conveyor each time, in a manner effective to distribute the articles over the full width of the second conveyor.

By reason of this arrangement, the necessity of utilizing a worker for the sole purpose of distributing articles over the width of the receiving conveyor is dispensed with entirely, the distribution apparatus illustrated discharging this function efficiently. The articles are thus disposed upon the receiving conveyor in such a manner as to permit other workers to grade, cull, or otherwise act upon the conveyed material, before said material is discharged by the second conveyor into a truck, wagon, or the like, not shown.

Of course, the arrangement can be employed to advantage in the distribution of various types of articles, whether said articles be fruit, vegetable, or manufactured objects.

It is considered to be an important characteristic of the invention that the arrangement is such as to effect the uniform distribution of the articles without subjecting said articles to free fall over a substantial distance. There is a minimum loss in elevation between the first and second conveyors, this being particularly important where easily bruised fruits or vegetables are being handled.

It is also thought worthy of note that although the several rollers are illustrated in a coplanar relationship by way of example, said rollers could be disposed at staggered heights, without departure from the spirit of the invention. This is considered to be sufficiently obvious as not to require special illustration herein.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. In a conveyor assembly the combination, with angularly related first and second conveyors, of a series of transfer rollers disposed to receive articles from the first conveyor before movement of said articles to the second conveyor, said rollers being spaced different distances from the first conveyor and decreasing in length in a direction away from said first conveyor.

2. In a conveyor assembly the combination, with angularly related first and second conveyors, of a series of transfer rollers overlying the second conveyor beyond one end of the first conveyor, so as to receive articles from the first conveyor prior to movement of said articles onto the second conveyor, said rollers being formed to different lengths, with the rollers terminating at one end substantially on a line bisecting the angle defined by the respective conveyors, thereby to distribute said articles uniformly across the width of the second conveyor.

3. In a conveyor assembly the combination, with a pair of angularly related, first and second conveyors, of a series of parallel transfer rollers extending normally to the first conveyor and overlying the second conveyor, said series extending over a substantial part of the width of the second conveyor, the rollers of the series being formed to different lengths with said rollers having one end terminating substantially on a line bisecting the angle defined by the conveyors, thus to distribute said articles uniformly over the width of the second conveyor.

4. In a conveyor assembly the combination, with angularly related first and second conveyors, of a series of parallel transfer rollers extending normally to the first conveyor and overlying the second conveyor beyond one end of the first conveyor, said series extending over a substantial part of the width of the second conveyor, the rollers of the series being formed to different lengths, with the several rollers being progressively decreased in length in a direction away from the first conveyor, said rollers having one end terminating substantially on a line bisecting the angle defined by the conveyors, for distributing articles uniformly over the width of the second conveyor.

5. In a conveyor assembly the combination, with angularly related first and second conveyors, of a framework mounted beyond one end of the first conveyor; a multiplicity of transfer rollers journaled on said framework and overlying the second conveyor, said rollers extending normally to the length of the first conveyor beyond said end of the first conveyor and being formed to different lengths with the rollers having one end terminating substantially in a line bisecting the angle defined by the conveyors; and means linking the first and second conveyors and the several rollers for joint driving thereof.

References Cited in the file of this patent

UNITED STATES PATENTS

| Number | Name | Date |
|---|---|---|
| 1,479,866 | Moores | Jan. 8, 1924 |